United States Patent [19]

Legge

[11] Patent Number: 4,718,201

[45] Date of Patent: Jan. 12, 1988

[54] METHOD FOR CUTTING A BOILER TUBE AND APPARATUS THEREFOR

[76] Inventor: Gerald A. Legge, R.R. #3, Box 342, Aurora, Ind. 47001

[21] Appl. No.: 809,325

[22] Filed: Dec. 16, 1985

Related U.S. Application Data

[63] Continuation-in-part of Ser. No. 721,581, Apr. 10, 1985, Pat. No. 4,633,555.

[51] Int. Cl.[4] .............. B26D 3/00; B26D 3/16; B23D 21/06; B26B 27/00
[52] U.S. Cl. .................... 51/241 S; 30/96; 30/97; 30/166 A; 30/102; 83/54
[58] Field of Search ............ 29/2.25; 30/96, 97, 30/124, 166 A, 371, 372, 102; 408/76, 92; 83/54; 51/241 S, 98 R, 99

[56] References Cited

U.S. PATENT DOCUMENTS

| | | | |
|---|---|---|---|
| 683,797 | 6/1901 | Reardon | 408/92 |
| 1,932,462 | 8/1932 | Howlett | 29/69 |
| 2,291,395 | 12/1939 | Levey | 29/69 |
| 2,367,582 | 1/1945 | Honyoust . | |
| 2,561,484 | 8/1949 | Shaw et al. | 90/12 |
| 2,589,554 | 3/1952 | Killian . | |
| 2,622,457 | 11/1951 | Buck | 408/76 |
| 2,818,892 | 1/1958 | Price . | |
| 2,921,492 | 1/1960 | Worth . | |
| 2,973,576 | 3/1961 | Hentke | 30/92 |
| 3,011,530 | 12/1961 | Lamb . | |
| 3,166,620 | 1/1965 | Galezniak | 266/23 |
| 3,279,059 | 10/1966 | Keiter | 30/96 |
| 3,704,516 | 12/1972 | Ono | 30/96 |
| 3,722,497 | 3/1973 | Hiestand et al. . | |
| 3,791,755 | 2/1974 | Warren | 408/76 |
| 4,077,292 | 3/1978 | Cole . | |
| 4,091,699 | 5/1978 | Chaze et al. . | |
| 4,095,495 | 6/1978 | Chaze et al. | 83/15 |
| 4,181,054 | 1/1980 | Striebig | 29/402.9 |
| 4,320,566 | 3/1982 | Boyer et al. | 83/471.3 X |
| 4,346,873 | 8/1982 | Domres . | |
| 4,390,309 | 6/1983 | Fangmann | 408/76 |

FOREIGN PATENT DOCUMENTS

| | | | |
|---|---|---|---|
| 7607516 | 7/1976 | Netherlands | 29/402.11 |
| 591364 | 8/1947 | United Kingdom | 30/372 |

OTHER PUBLICATIONS

F & M Catalog, VU-160 Universal Cutting Machine, p. 270.
Setco Mach-Mate Building Blocks Catalog, 1974-p. 4.

Primary Examiner—Paul A. Bell
Assistant Examiner—Scott A. Smith
Attorney, Agent, or Firm—Wood, Herron & Evans

[57] ABSTRACT

A portable tube cutter and a method of cutting a boiler tube in a power generating station with the portable tube cutter is disclosed comprising electromagnetically clamping a portable tube cutter to a circumferential portion of a tube to be cut in a power generating station, the tube cutter having a frame formed with a clamping element adapted to fixedly, electromagnetically mount to a circumferential portion of the tube and having a power driven cutting element operable to cut the tube and movable upon the frame along an axis which intersects the longitudinal axis of the tube at an angle; and thereafter moving the power driven cutting element along the axis of movement and into engagement with the tube for cutting the tube. The frame of the cutter preferably has a portion adjustable with respect to the clamping element and the power driven cutting element is preferably movable upon the adjustable frame portion, wherein the method further comprises adjusting the frame portion after clamping the tube cutter to the tube whereby to adjust the axis of movement of the power driven cutting element relative to the tube.

13 Claims, 6 Drawing Figures

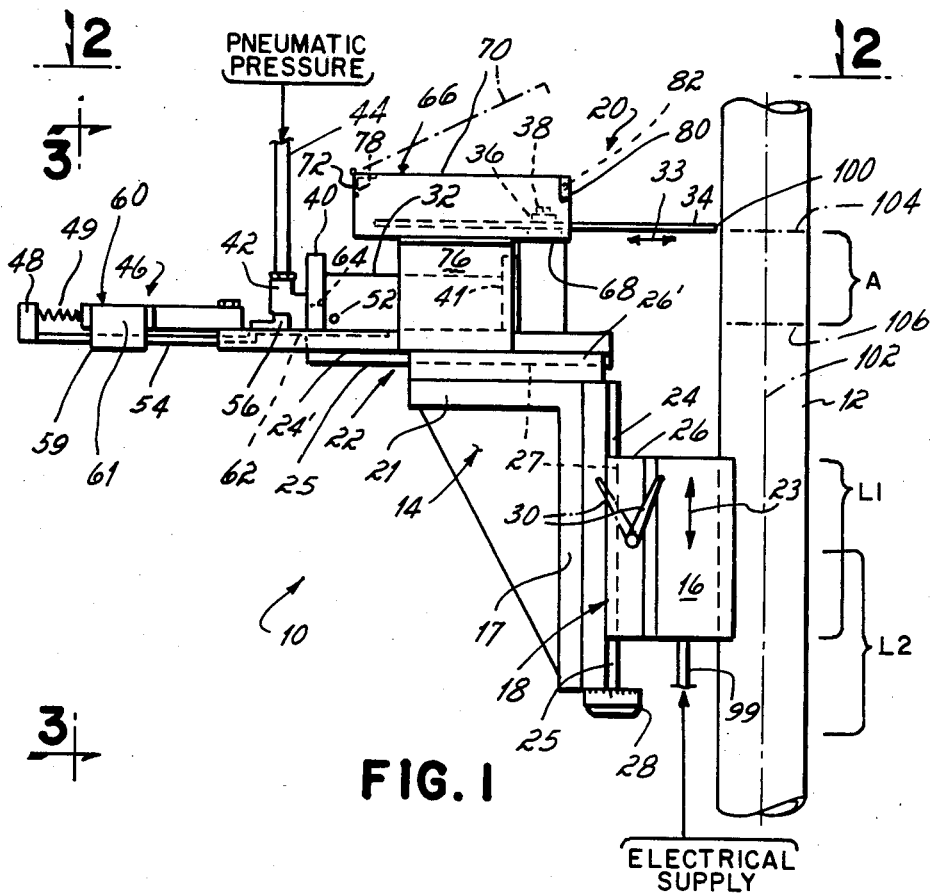
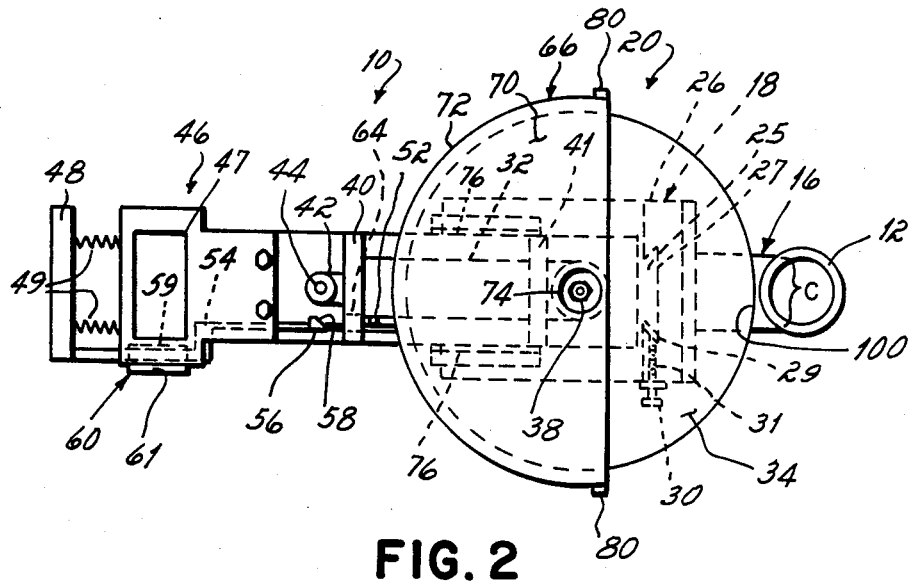

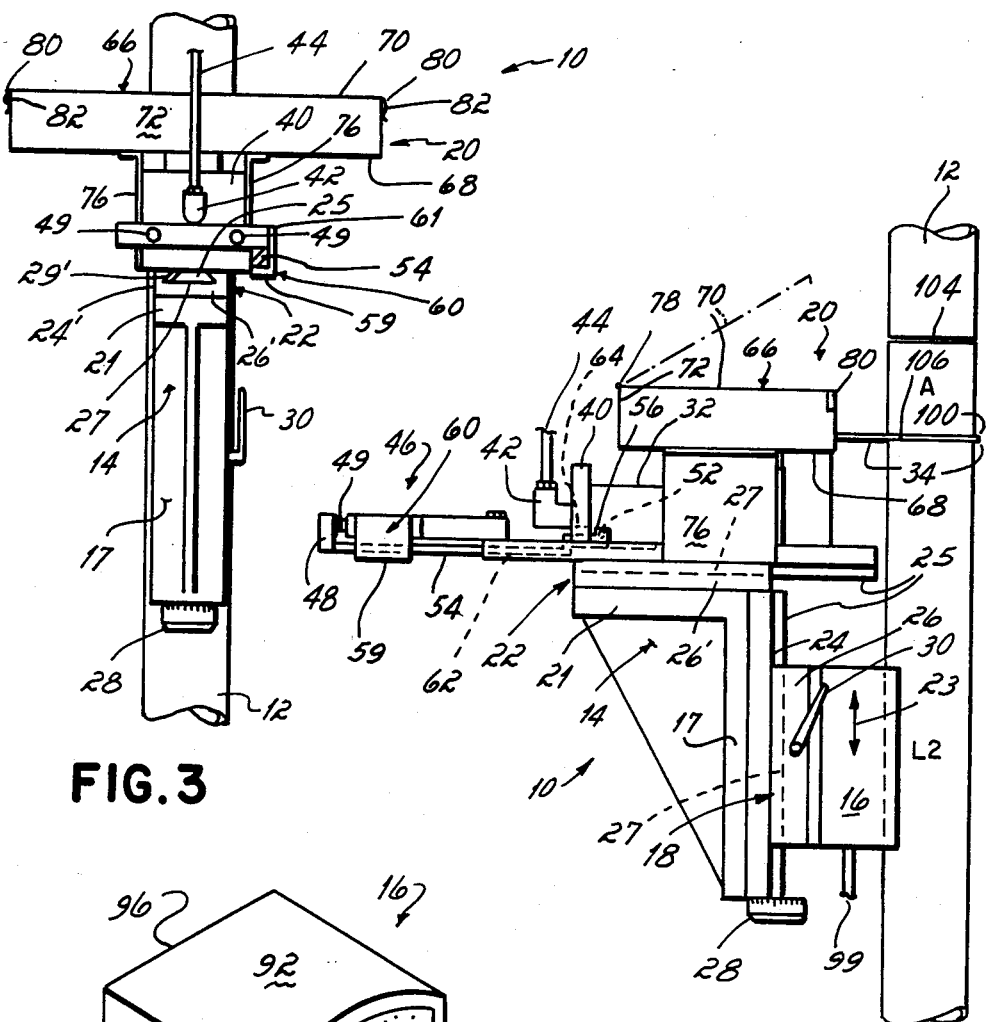
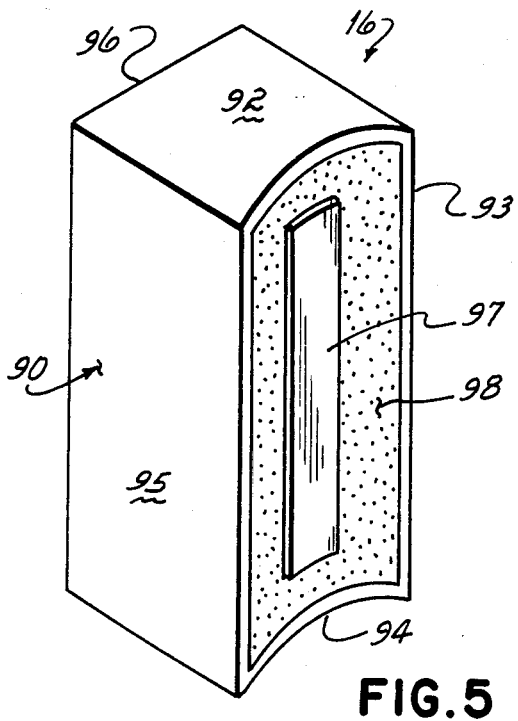
FIG. 3
FIG. 4
FIG. 5

METHOD FOR CUTTING A BOILER TUBE AND APPARATUS THEREFOR

RELATED APPLICATIONS

This application is a continuation-in-part of my previously filed application Ser. No. 721,581, now U.S. Pat. No. 4,633,555, filed Apr. 10, 1985, and entitled "Method for Cutting Tube-Walls and Apparatus Therefor".

BACKGROUND OF THE INVENTION

I. Field of the Invention

This invention relates to a method of and apparatus for cutting a tube. Specifically, the present invention relates to such a method for cutting a boiler tube in a power generating station and to an apparatus therefor.

II. Description of the Prior Art

A typical power generating station includes one or more generating boilers to generate steam to turn the turbines. Generating boilers are of rather large construction, often reaching several tens of feet in height and involving several hundreds of cubic feet of space. A generating boiler is typically a large steel building-like structure wherein the interior of the steel or brick walls are lined by tube-walls to define a massive interior space. The hollow interior is filled with heat generating material, such as burning coal and the like. The tube-walls of the boiler are formed of hundreds of long, generally vertical steel tubes (e.g. 2-inch tubes, having a wall thickness of about ¼ inches) which are welded together with long, narrow (e.g. ⅛ or ⅜ inch) strips of steel membrane or web to form a generally sealed container. A typical boiler may include as many as fourteen hundred such tubes. Additionally, in certain areas of the boiler such as in the penthouse or roof area of a boiler, several such steel tubes are present but may not be joined or welded to other tubes such as by a membrane or web and may not present a surface in a plane common to a plurality of tubes. Typically, water is pumped through the tube-walls and single boiler tubes and heated by the burning coal within the building. The heated water is utilized to generate electricity by turning turbines, for example.

Occasionally, it may be necessary to repair or replace a defective portion of a single tube or a plurality of such single tubes in the penthouse, for example. These tubes are free standing in that they are not connected by a web or membrane to an adjacent tube, but they are rigidly held in place within the boiler structure as they form part of an intricate network of plumbing.

To remove the portion of defective tube, one or more workmen using hand-held power saws (or grinders) would make two generally parallel spaced-apart cut lines through the tube. To accomplish these cuts, the workmen would push the edge of a rotating grinding blade against the surface of the tube and move it back and forth and around the tube until the tube is cut or ground through. The use of hand-held power tools in this fashion is both time-consuming and very inaccurate leading to time consuming and costly rework to fit the new section of tube in place. As an example, it takes approximately 33 man-minutes to cut through a typical 2-inch diameter steel boiler tube with a hand-held power saw according the the foregoing method.

Typical of hand-held power saws used for this prior method is a tool referred to as a "Rockwell 90" which is relatively small and uses a small three or four inch cutting or grinding disc. The cut made by the small disc may appear as though it wobbled as it cut due to the inherent inability to maintain a precise line of cut with a hand-held power tool. Of course, use of a larger disc would likely lead to more apparent wobble and may be too dangerous for use according to the method now commonly employed to cut the tube. Further, the workman is likely to veer substantially from the intended cut-line from time to time because of the above limitation inherent in the use of such hand tools. As a result, the cut-line is not straight but has hills and valleys. These hills and valleys must be removed or built up, respectively, to mate the new tube portion with the remaining tube.

The curative steps involved in removing or building-up the tube-wall are very time-consuming, costly and prone to error. For example, a valley would require the use of a small insert referred to as a dutchman. The dutchman must be welded in place between the existing tube and the new tube portion. These added welds take time and increase the chances of making a defective weld. Defective welds would result in rejection of the work by the owner (e.g., the power company) and, hence, costly re-work to correct the error. Additionally, the time consumed in cutting, removing, inserting and reworking tube portions is precious as the power company is likely to be operating at reduced capacity while that generating boiler is being serviced. Hence, it is imperative that removal and replacement of tube portions occur as rapidly as possible. The time currently necessary to make each line of cut, the time-consuming rework and preparation of exposed tube ends after each such cut, and placement/welding of the new portion of tube may well run into hours instead of minutes, all at great cost in down-time to the power company and in wages and related labor expenses. Also, because single-tube repair often occurs in the highest portion of the boiler, the workers are exposed to potentially serious risk for the long time during which they are working on the tube(s). Also, such tubes may often be in difficult-to-reach locations thus making careful, clean cuts all the more difficult.

Some power driven tube cutters have been described such as in U.S. Pat. Nos. 3,704,516 and 2,291,395 to name a couple. However, such devices operate by surroundingly clamping completely about the tube and making a planetary cut about the tube. In the boiler tube environment, such devices are typically of little use for two reasons. First, the tube to be cut is typically positioned very close to the other tubes and/or the wall. Hence, there is insufficient room for the cutter to be rotated about the tube to make a planetary cut. Second, the tube may be so close to another tube or the wall that the clamping structure, such as a chain, cannot surroundingly grasp the tube. Hence, hand-held tools have remained the norm for cutting boiler tubes.

In addition to the above-discussed drawbacks to the use of hand-held power tools, a further drawback is that the cutting or grinding discs wear out frequently. For example, to cut or grind through a 2-inch tube as before-described requires, on average, approximately three and one half discs. That is, on average, for every ten tubes cut, thirty-five discs are expended in the process. As a result, large tool costs are incurred for each tube to be repaired Additionally, several such tools are typically in use (by several workmen) at the same time in an effort to minimize down-time of the boiler. Because a number of the tools must thus be available, tool costs are high.

Finally, because the hand-held power saws are relatively small, and there are so many on the job site, they are an easy target for costly pilferage.

Accordingly, it has been one objective of the present invention to provide a method and apparatus for cutting a boiler tube in a power generating station in a few man-minutes thereby greatly reducing labor costs and related labor expenses.

Another objective of the present invention has been to provide a method and apparatus for rapidly cutting a boiler tube with relatively few tools thereby reducing tool costs.

An even further objective of the present invention has been to provide a method and apparatus for cutting a boiler tube which utilizes a relatively small hand tool but which overcomes the inherent limitations of using such a tool.

A still further objective of the present invention has been to provide a method and apparatus for removing a portion of a boiler tube in generally inaccessible or difficult to reach locations.

Another objective of the present invention has been to provide a method and apparatus for removing a portion of a boiler tube in only a few man-minutes, thereby greatly reducing labor costs and related expenses, but which results in exposed tube ends which are easily prepared to receive a new tube portion without extensive rework.

A yet further objective of the present invention has been to provide an apparatus for cutting a boiler tube which apparatus is portable yet has the advantages sought in the method herein.

SUMMARY OF THE INVENTION

The method and apparatus therefor provided by the present invention achieve the above objectives of the invention. Specifically, a portable tube cutter is provided which can be electromagnetically clamped directly to a circumferential portion of the boiler tube to be cut and which has a power driven cutting element linearly movable upon an axis which intersects the longitudinal axis of the tube to cut the tube. Preferably, the tube cutter is provided with an adjustment mechanism by which the relationship between the tube and the axis of movement of the power driven cutting element can be adjusted after the tube cutter is electromagnetically clamped to the tube. The present apparatus, when employed according to the method of the present invention, permits a cut to be made completely through a 2-inch steel boiler tube in as little as less than one man-minute. As a result, fewer workers take less time to accomplish the job. Also, by virtue of employing the tube cutter of this invention, the power driven cutting element may be a relatively small hand tool which, in conjunction with the remaining structure of the cutter, functions to provide a portable yet larger, more durable and more stable tool than previously employed. This now stable tool permits operation of the tool at advantageously higher speed and with larger cutting discs than previously utilized. Thus, even more tubes may be cut through in a given period of time than previously possible thereby permitting reduction of tool count (and costs) and the related drawbacks. Further, by electromagnetically clamping to only a circumferential portion of the boiler tube and cutting linearly through the longitudinal axis of the tube, the difficulty previously encountered in grasping or cutting the tube in generally inaccessible locations is overcome. Finally, because the method of the present invention provides an accurate, straight cut, it is possible to remove a defective portion of tube accurately and with little need for curative steps before insertion of the replacement tube portion.

In accordance with the present invention and in its broadest aspects, there is thus provided a method of cutting a boiler tube in a power generating station, comprising: electromagnetically clamping a portable tube cutter to a circumferential portion of a boiler tube to be cut, the tube cutter having a frame formed with an electromagnetizable clamping element adapted to electromagnetically, fixedly mount to a circumferential portion of the tube and having a power driven cutting element operable to cut the tube and linearly movable upon the frame along an axis which intersects the longitudinal axis of the tube at an angle; and thereafter moving the power driven cutting element linearly along the axis of movement and into engagement with the tube for cutting the tube. Preferably, the method further includes moving a portion of the power cutting element substantially completely through the tube along a first line of cut defined by the axis of movement of the power driven cutting element. Further preferably, the frame has a portion which is adjustable with respect to the clamping element and the power driven cutting element is linearly movable upon the adjustable frame portion so that after clamping the tube cutter to the tube the axis of movement of the power driven cutting element may be adjusted relative to the tube as desired.

The present invention permits complete removal of a defective boiler tube portion from a tube by preferably: electromagnetically clamping the portable tube cutter to a circumferential portion of a boiler tube to be cut at a first location on the tube and thereafter linearly moving the power driven cutting element a first time into engagement with the tube and substantially completely through the tube for cutting the tube along a first line of cut defined by the axis of movement of the power driven cutting element; and thereafter unclamping the portable tube cutter from the tube and subsequently reclamping the portable tube cutter to the tube at a second location on the tube spaced from the first location; and thereafter linearly moving the power driven cutting element a second time into engagement with the tube and substantially completely through the tube for cutting the tube along a second line of cut defined by the axis of movement of the power driven cutting element; whereby a portion of the tube defined between the first and second lines of cut is removable from the tube. As mentioned, the frame preferably has a portion adjustable with respect to the clamping element and the power driven cutting element is linearly movable upon the adjustable frame portion. As preferred, the method thus further comprises adjusting the frame portion after clamping the tube cutter to the tube at either or both the first and second location but before moving the power driven cutting element for cutting to thereby adjust the axis of movement of the power driven cutting element relative to the tube.

A defective tube portion may be removed by an alternative method according to this invention with the portable tube cutter having the preferred adjustable frame portion upon which the power driven cutting element is movably mounted, the alternative method comprising electromagnetically clamping the cutter to a circumferential portion of a boiler tube to be cut at a first location on the tube; and thereafter linearly moving the power driven cutting element a first time into engagement with the tube and substantially completely through the tube for cutting the tube along a first line of cut defined by the axis of movement of the power driven cutting element; and thereafter adjusting the frame portion whereby to adjust the axis of movement of the power driven cutting element relative to the tube; and thereafter linearly moving the power driven cutting element a second time into engagement with the tube and substantially completely through the tube for cutting the tube along a second line of cut defined by the adjusted axis of movement of the power driven cutting element. By this alternative method, the portion of the tube defined between the first and second lines of cut is removable from the tube but without unclamping and reclamping the tube cutter.

The clamping element of the apparatus of this invention is preferably an electromagnetizable metal box having a metal core to permit electromagnetic clamping of the tube cutter to a circumferential portion of metal tubes such as those typically encountered in the power generation environment in connection with which my invention was developed.

The apparatus particularly useful in the present invention is a tube cutter adapted to be electromagnetically clamped to a circumferential portion of a boiler tube to be cut wherein the cutter comprises a frame formed with an electromagnetic clamping element adapted to fixedly mount to a circumferential portion of a boiler tube to be cut; and a power driven cutting element operable to cut the tube and linearly movable upon the frame along an axis, the axis and clamping element positioned relative each other such that when the tube cutter is clamped to the tube, the axis intersects the longitudinal axis of the tube at an angle and the power driven cutting element is linearly movable into engagement with the tube for cutting the tube. The apparatus particularly useful in the present invention further preferably includes an adjustment mechanism for adjusting a portion of the frame with respect to the clamping element, the power driven cutting element being linearly movable upon the frame portion whereby to adjust the axis of movement of the power driven cutting element relative to the tube when the tube cutter is clamped to the tube.

In accordance with the principles of the present invention, it is possible to clamp to and cut through a 2-inch steel boiler tube in approximately one man-minute or less and in tight spaces which would have otherwise required manual cutting with hand tools. Thus, a defective section of boiler tube can be removed in a matter of minutes instead of the one or more man-hours previously necessary. Further, in accordance with the present invention, the cut made on the tube will generally not have hills and valleys requiring corrective measures to install the new portion of tube. Hence, after the defective portion is removed, the exposed tube ends will be more easily prepared and will result in more effective and acceptable welds without the use of expensive and/or time-consuming curative steps.

BRIEF DESCRIPTION OF THE DRAWINGS

These and other features and advantages of the invention will become more readily apparent from the following detailed description taken with the accompanying drawings in which:

FIG. 1 is a side elevation view of a tube cutter apparatus useful in practicing the method of the present invention and which is electromagnetically clamped at a first location to a length of metal boiler tube for purposes of explaining the method of the present invention;

FIG. 2 is a view of the tube cutter apparatus of FIG. 1 taken along line 2—2 for purposes of explaining the method of the present invention;

FIG. 3 is a view of the tube cutter apparatus of FIG. 1 taken along line 3—3 for purposes of explaining the method of the present invention;

FIG. 4 is a side elevation view of the tube cutter apparatus of FIG. 1 clamped at a second location on the tube and with the power driven cutting element in a different position than that of FIG. 1 wherein the tube is completely cut through for purposes of further explaining the method of the present invention;

FIG. 5 is a perspective view of a preferred electromagnetizable clamping element of the invention.

DETAILED DESCRIPTION OF DRAWINGS

Figure 6:
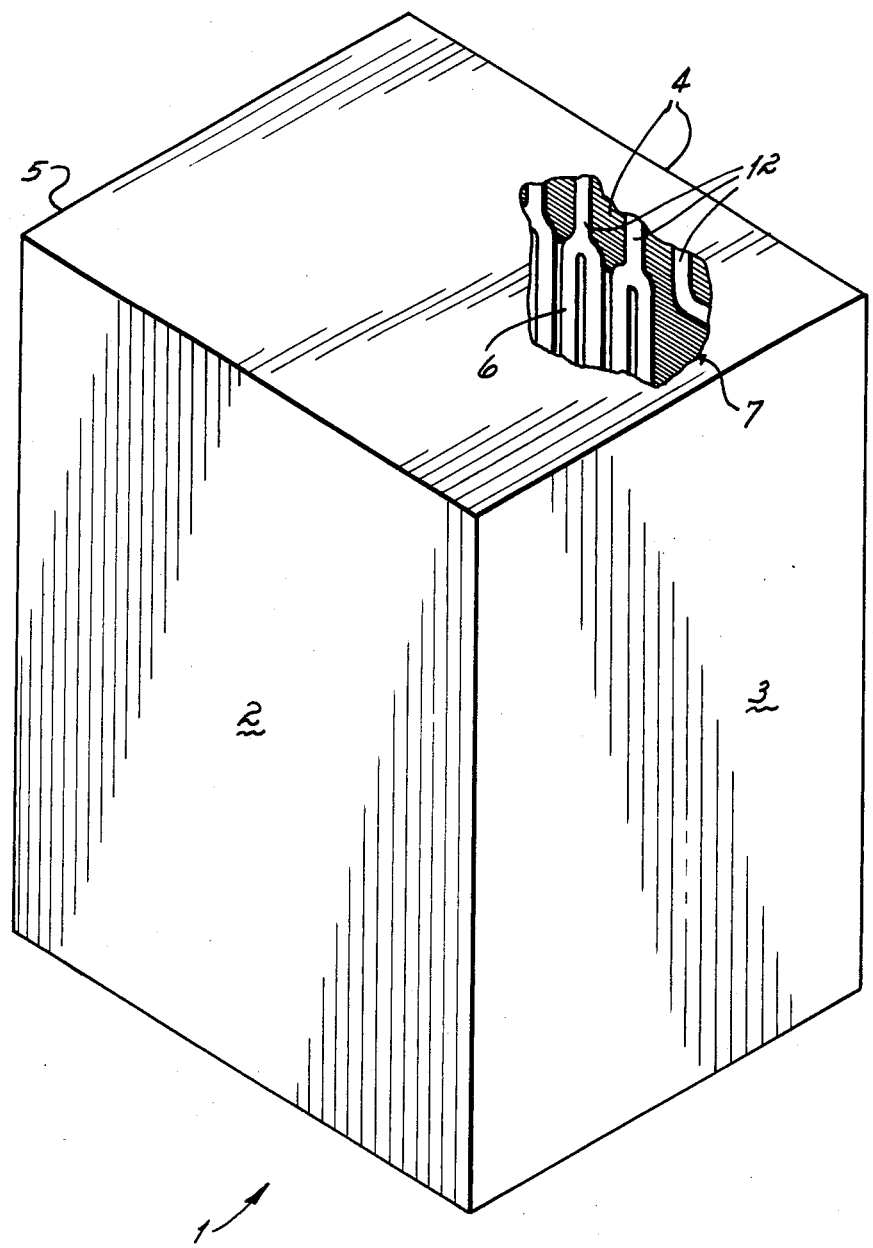
FIG. 6 is a perspective view of a generator-boiler structure with a cutout to expose a portion of one interior wall adjacent the roof or penthouse area of the structure.

The apparatus and method of my invention were developed in the context of the power generation boiler environment. As seen in FIG. 6, a generating station boiler may be represented by a structure 1 having four contiguous steel or brick walls 2 through 5. Along and adjacent the interior of walls 2 through 5 are tube walls 6 (only one may be seen through cutout 7). Tube-walls 6 most commonly encountered in such an environment and method and apparatus for cutting such tube-walls are disclosed in my previous application, Ser. No. 721,581 now U.S. Pat. No. 4,633,555, filed Apr. 10, 1985, and entitled "Method for Cutting Tube-Walls and Apparatus Therefor", which is incorporated herein by reference. Such a method and apparatus is advantageous where there are a plurality of tubes to be cut and they lie in a common plane such that a lengthy saw guide as disclosed in my previous application may be employed with respect to cutting a single tube. However, tube walls 6 may terminate in a plurality of single tubes 12, also along and adjacent the interior of the walls. Tubes 12 may be in the penthouse or roof area 8 of boiler 1, for example. The invention of my previous application may not be desired such as where a single tube 12 is to be cut in a confined area or where the tube does not lie in a plane common to other tubes. Accordingly, the apparatus and method described herein is provided.

With reference to FIG. 1 there is shown in side elevation a tube cutter apparatus 10 according to the present invention. Tube cutter 10 is shown electromagnetically clamped at a first location L1 to a length of 2" metal boiler tube or pipe 12 which is to be cut as hereafter described. Also, as can readily be seen in FIG. 2, apparatus 10 is only clamped to a circumferential portion C of tube 12. Tube cutter 10 preferably includes an L-shaped frame or bracket 14 having an electromagnetizable clamping element 16 selectively, linearly, movably mounted to front wall 17 of frame 14 by first carriage 18 and a power driven cutting element 20 operable to cut tube 12 and which is linearly movably mounted to top wall 21 by second carriage 22. Each of carriages 18 and 22 are a type MO 2" Slide available from Setco Industries, Inc., Cincinnati, Ohio, and comprise feed 24, 24', respectively, and slide plate 26, 26', respectively. Each carriage is provided with a dovetail projection 25 on each feed matable with a recess 27 in each slide plate for sliding engagement therebetween. Carriages 18 and 22 include internal adjustable gib 29, 29', respectively, as provided with the type MO 2" Slide although the adjustability of the gib, which permits locking of slide plate 26 to feed 24, is utilized only in connection with first carriage 18 as will be described hereafter. Gib 29' of second carriage 22 is preferably not utilized to lock plate 26' to feed 24' thereof so as to permit feed 24' to slide freely relative its associated slide plate 26'. The type MO 2" Slide is also provided with a vernier adjust or micrometer handwheel 28 by which slide plate 26 can be precisely moved relative to feed 24 as is well understood. Vernier adjust 28 has preferably been removed from second carriage 22 so as to further permit unrestricted movement of slide plate 26' relative to feed 24'. This latter version is referred to as a type MOY 2" Slide.

Feed 24 and slide plate 26' are secured to front wall 17 and top wall 21, respectively, by conventional means. Similarly secured to slide plate 26 is electromagnetizable clamping element 16. Hence, frame 14 is linearly adjustable relative to clamping element 16 by adjusting the position of plate 26 relative associated feed 24 by vernier adjust 28. Typically, adjustable gib 29 is held in the locking position by lever 30 and screw 31 as shown in solid line in FIG. 1 and as is well understood. To permit adjustment of frame 14 relative clamping element 16, locking lever 30 is rotated counter-clockwise as seen in FIG. 1 to the unlocking position shown in dotted line. This causes gib 29 to loosen its grip against projection 27 between plate 26 and feed 24 permitting movement of plate 26 in the directions of arrow 23 by vernier adjust 28 as is well understood. After adjustment, lever 30 is returned to the locking position shown in solid line.

Secured to feed 24' is power driven cutting element 20. Hence, cutting element 20 is linearly movable upon frame 14 due to second carriage 22. As second carriage 22 does not have a locking lever, gib 29' is not adjustable whereby to lock second carriage 22 into a fixed position. Hence, cutting element 20 is easily slidable relative frame 14 along an axis as represented by arrow 33.

Power driven cutting element 20 includes a handheld air motor 32 to which is rotatably mounted grinding blade 34. Blade 34 is a generally circular, planar disc and is secured to chuck 36 extending from air motor 32 by nut 38 for rotation with chuck 36 when motor 32 is activated and coupled to a source of pneumatic pressure as is well understood. Air motor 32 is secured to feed 24' by a pair of mounting brackets 40, 41 positioned at opposite ends over air motor 32. Air motor 32 is mounted to feed 24' such that it is held on its back whereby blade 34 is generally parallel top-wall 21. For purposes herein, axis of movement 33 is defined in the plane of blade 34. Mounting brackets 40, 41 are secured to feed 24' by conventional fasteners such as nuts and bolts (not shown). Brackets 40, 41 each have a generally inverted U-shaped to conform to the surface of air motor 32 which they overlie. Extending from the rear of air motor 32 is air coupling 42 to which is releasably coupled pneumatic hose 44 with which to deliver pneumatic, or air, pressure to drive air motor 32 as is well understood.

Secured to and extending rearwardly, or leftwardly as seen in FIGS. 1 and 2, from feed 24' is T-shaped handle bracket 46. Handle bracket 46 is apertured as at 47 to permit the fingers of an operator's hand (not shown) to fit therethrough to assist in gripping and moving cutting element 20 as will hereafter be described. Movably positioned further rearwardly of handle bracket 46 is actuator bar 48 operable to actuate air motor 32. Actuator bar 28 is urged rearwardly by a pair of resilient springs 49 positioned between actuator handle 48 and the rearwardmost end of handle bracket 46. Slidably positioned below handle bracket 46 and extending from actuator bar 48 towards actuator button 52 of motor 32 is step-shaped actuator rod 54. At the forward end of step-shaped actuator rod 54 is cam block 56 having a forwardly cammed surface 58.

Actuator rod 54 is slidable between lower wall 59 of L-shaped guiding bracket 60 and the bottom side of handle bracket 46. Wall 61 of bracket 60 is secured outboard of handle bracket 46 to thus slidably sandwich a portion of actuator rod 54. Step-shaped actuator rod 54 further slides in a slot or channel 62 in the top surface of feed 24 of carriage 22 and passes through an opening 64 in mounting bracket 40. Cam block 56 is affixed to the forwardmost end of rod 54 and is movable therewith such that cammed surface 58 will engage button 52 when bar 48 is depressed towards bracket 46. When button 52 is depressed, pneumatic pressure from hose 44 is coupled to air motor 32 to thereby rotate blade 34 for cutting or grinding a tube 12 as will be described.

Positioned above the body of air motor 32 is blade housing 66 which provides a measure of safety to the operator of tube cutter 10 as is well understood. Housing 66 is a semi-circular shaped structure having a floor portion 68 positioned below the plane of blade 34, a roof portion 70 positioned above the plane of blade 34, and an arcuate wall 72 interconnecting roof 70 to floor 68. Floor 68 of blade housing 66 is apertured as is well understood to permit chuck 36 to extend therethrough. Roof 70 of housing 66 may also be apertured as at 74 to permit access to nut 38 by a wrench or ratchet or the like to loosen or tighten nut 38 for purposes of removal and replacement of blade 34 as is well understood. Blade housing 66 is mounted to feed 24' by a pair of upstanding walls 76 secured to either side of feed 24' and the underside of floor 68. Preferably, roof 70 is pivotally mounted to the rear of wall 72 by hinge 78. Roof 70 is held in the closed position as shown in solid line in the figures by a pair of resilient spring fingers 80 depending from the corners of roof 70 which cooperate with a pair of detents 82 in each end of wall 72 as is well understood. In order to change blade 34, for example, an operator (not shown) may conveniently pivot roof 70 about hinge 78 to the open position as shown in dotted line in FIG. 4 and thereby obtain complete and full access to blade 34 and nut 38.

With reference to FIG. 5, a preferred electromagnetizable clamping element 16 is shown and comprises a metal box 90 having four contiguous walls 92, 93, 94, 95 and a back wall 96. Extending forwardly from back wall 96 and positioned centrally of walls 92-95 is generally rectangular metal core 97 about which is wound a plurality of electrical coils (not shown). The coils (not shown) are covered with solidified potting material 98 to hold them in box 90 and to provide additional insulation to prevent accidental damage to clamping element 16 or to an operator (not shown). The coils (not shown) are preferably sufficient in number and gauge that when energized by a DC current on power cord 99, element 16 will have a pull of 400 to 600 pounds at a 100% duty cycle of a rectified AC current. The forwardly surface of walls 92-95 and core 97 are chamfered to define an arcuate surface having a radius generally conforming to circumferential portion C of tube 12 (FIG. 2). In the preferred embodiment, the radius is 2" but need not be precisely matched to the tube to secure apparatus 10 thereto for proper operation.

Walls 92, 94 are preferably about 2 inches long such that clamping element 16 is about equal in width to tube 12. Hence, when fixedly mounted to tube 12, apparatus 10 may be viewed as longitudinally secured to tube 12 and to circumferential outer-wall portion C. Preferably, walls 93, 95 are at least 4 inches long and more preferably about six inches in length to permit sufficient coils to be wound about core 97 to provide the desired pounds of pull as mentioned.

In operation, tube cutter apparatus 10 is normally held in position at a first location L1 against boiler tube 12 as seen in FIG. 1 and a source of electrical power is supplied to electromagnetizable clamping element 16 via power cord 99. When energized, clamping element 16 is fixedly mounted to a circumferential portion of tube 12 as seen in the figures, and axis of movement 33 of cutting element 20 intersects the longitudinal axis 102 of pipe 12 at an angle of 90°, that is, transverse thereto. While intersection at an angle of 90° is preferred, modifications may be made to frame 14, for example, whereby axis 33 intersects longitudinal axis 102 at different angles as desired. The cutter apparatus 10 is positioned such that cutting edge 100 of blade 34 is linearly movable along axis 33 toward and away from tube 12 in a plane defined by and in line with a desired first line of cut 104 shown in dotted line in FIG. 1 (and forwardly and rearwardly of a vertical plane defined by front wall 17). If blade 34 is not properly aligned, lever 30 may be moved to the unlocked position and frame 14 selectively, linearly adjusted with vernier adjust 28 such that cutting edge 100 of blade 34 is movable upwardly or downwardly (parallel to longitudinal axis 102) until it is properly positioned. Lever 30 is then returned to the locking position. The operator (not shown) would then grab handle bracket 46 depressing actuator bar 48 to cause blade 34 to rotate. Thereafter and/or simultaneously therewith, the operator (not shown) would move feed 24' from a start position as shown in FIG. 1 linearly forwardly along axis 33 such that cutting edge 100 of power drive cutting element 20 comes into engagement with boiler tube 12 for cutting tube 12. Preferably, movement would continue until tube 12 is completely cut through along line of cut 104 as exemplified in FIG. 4 for cutting through line of cut 106 whereupon cutting element 20 would be in a finish position (i.e., blade 34 would also intersect and/or pass through axis 102 of the 12). Thereafter, the operator (not shown) would typically release pressure on actuator bar 48 and would also pull rearwardly (or leftwardly as seen in FIG. 1) on handle bracket 46 to thereby return cutting element 20 to the start position seen in FIG. 1. In so doing, pressure is typically relieved from actuator bar 48 thereby disabling air motor 32 and preventing rotation of blade 34, however, the operator (not shown) need not relieve pressure from actuator bar 48 and may permit continued rotation of blade 34 while withdrawing power driver cutting element 20 as previously described.

To remove a defective portion A of boiler tube 12 defined between first line of cut 104 and a second line of cut 106 also shown in dotted line in FIG. 1, the aforesaid method is employed with respect to cutting through first line of cut 104. Thereafter, clamping element 16 is deenergized such that tube cutter apparatus 10 may be unclamped from tube 12 at the first location L1 shown in FIG. 1. Thereafter, tube cutter 10 is repositioned against tube 12 at a second location L2 (as shown in FIG. 4) spaced below first location L1, for example, and clamping element 16 again energized thereby to electromagnetically reclamp tube cutter apparatus 10 to tube 12 at the second location L2. Preferably, second location L2 is selected such that blade 34 is aligned with and defines second line of cut 106 although adjustment may be accomplished to that end as previously described. Once positioned, cutting is again accomplished as also previously described with cutting edge 100 again brought into engagement with tube 12 for cutting and thereafter pushed completely through tube 12 but along line of cut 106 as opposed to line of cut 104.

Alternatively, defective portion A of tube 12 may be removed without unclamping and reclamping tube cutter apparatus 10 as before described if the distance between cut lines 104 and 106 is such that any needed adjustment of the position of blade 34 relative tube 12 (and hence axis 33 relative longitudinal axis 102) to accomplish same is within the range of movement of carriage 18. According to this alternative method, after cutting through line of cut 104, cutting element 20 may be repositioned by operation of lever 30 and movement of frame 14 on carriage 18 as previously described, such that axis 33 is now aligned with line of cut 106. Thereafter, a cut may be made through line of cut 106 as before described and portion A removed from tube 12.

Air motor 32 may be any relatively small hand tool such as a Rockwell 90 as heretofore described, although preferably, air motor 32 is a Model 755 air tool available from Merit Abrasive. The Model 755 is preferred because it can attain a higher speed than the Rockwell 90, although the Merit Abrasive tool is also a relatively small hand-held tool similar in size to the Rockwell 90. The Merit Abrasive tool can attain speeds as high as 11,500 rpm and it is preferred in the method and apparatus of the present invention to rotate blade 34 as fast as it can safely be rotated. Also, while a three or four inch blade could be used as was done in the prior art, it is preferable to use a larger diameter blade. While the larger diameter blade is not advised with respect to hand tools which would be manually operated unless at very slow speeds, it may now be used in the apparatus 10 of the present invention due to the more stable operation thereof achieved by the invention. The preferred blade is a carborundum wafer blade from Norton referred to as an A60OBNA2.

With the foregoing apparatus of the present invention, cutting edge 100 is preferably, repeatably presentable to boiler tube 12 generally transversely of longitudinal axis 102 of pipe 12 providing increased blade life. Whereas by hand, 3 to 3½ blades were expended per line of cut, it is possible with the apparatus of the present invention to apply greater pressure between cutting edge 100 and tube 12 during cutting thereof than previously possible by hand and yet obtain faster and better cuts with less blade wear. Indeed, it is believed that by increasing the pressure between edge 100 and tube 12, blade life will also increase. Further, because apparent wobble is reduced due to the stability of the apparatus of the present invention, the destructive impact of the surface of the blade against the tube end within the cut such as by instability of the user's hand, is reduced or eliminated. Thus, it has been found that with the apparatus of the present invention, as the speed of rotations is increased, and greater pressure is applied by pushing on handle bracket 48, single blade 34 will be able to make more cuts before requiring replacement than previously possible.

The apparatus of the present invention used in accordance with the method of the present invention has been found to produce accurate, straight cuts which would make preparation of the exposed tube ends (the ends of the tube exposed by removal of defective portion A, for example) for receiving a new tube section of boiler tube (not shown) for welding therein easier and more reliable and more amenable to safe and acceptable welds. Such preparation of tube ends and their appearance is shown in my aforesaid previous patent application which has been incorporated herein by reference. Moreover, with the apparatus of the present invention, a portion of 2-inch steel boiler tube which would previously have required laborious, costly and ineffective manual hand tool operation can be easily cut and removed therefrom in a matter of minutes leaving behind the desired substantially smooth, straight exposed tube ends.

Having described the invention, I claim:

1. A tube cutter apparatus for cutting a tube into two, wherein the tube is constrained against rotation and only a circumferential segment thereof is generally accessible prior to cutting the tube, said tube cutter apparatus comprising:

a frame;

clamp means mounted on said frame for clamping said frame to only a portion of an accessible circumferential segment of a tube to be cut such that said frame and the tube are constrained from rotational movement relative one another;

slide means movably mounted on said frame for free-sliding movement along said frame in a straight line path towards and away from the circumferential segment of the tube when said frame is clamped thereto;

selectively energizable motor means mounted for movement with said slide means for providing rotation when energized;

a grinding wafer having a circular outer cutting periphery, said wafer coupled to said motor means for rotation thereby and movement therewith, said motor means mounted to said slide means such that said wafer periphery is rotatable and movable in a movement plane parallel a plane of cut to be made through the tube and into and out of cutting engagement with the tube as said slide means is moved towards and way from the circumferential segment when said frame is clamped thereto and said motor is energized; and combination slide control/switch means for selectively energizing said motor means and permitting selective control of said movement of said slide means, said motor means being energized by application of pressure to said combination means, said combination means mounted to said slide means such that when pressure is applied to said combination means to energize said motor means said slide means will be caused to be moved toward the circumferential segment of the tube whereby to cut the tube into two in said movement plane with said cutting periphery without relative rotation between the tube and said frame and without grippingly engaging a generally nonaccessible portion of the tube opposite the circumferential portion to which said frame is clamped.

2. The tube cutter apparatus of claim 1, said clamp means being adjustably mounted on said frame, the tube cutter apparatus further comprising adjustment means for selectively adjustably positioning said frame relative said clamp means when said frame is clamped to the tube whereby to adjust said movement plane towards or away from said plane of cut.

3. The tube cutter apparatus of claim 1, said clamp means including selectively electromagnetizable means for electromagnetically clamping said frame to a metal tube.

4. A tube cutter apparatus for cutting a tube into two, wherein the tube is constrained against rotation and only a circumferential segment thereof is generally accessible prior to cutting the tube, said tube cutter apparatus comprising:

a frame;

clamp means mounted on said frame for clamping said frame to only a portion of an accessible circumferential segment of a tube to be cut such that said frame and the tube are constrained from rotational movement relative one another, said clamp means including a plurality of contact edges to contact the tube exterior wall, said contact edges defining an arcuate surface having a radius generally conforming to the circumferential portion of the tube to which said frame is clamped;

slide means movably mounted on said frame for free-sliding movement relative said frame in a straight line path towards and away from the circumferential segment of the tube when said frame is clamped thereto;

motor means mounted for movement with said slide means for providing rotation; and a grinding wafer having a circular outer cutting periphery, said wafer coupled to said motor means for rotation thereby and movement therewith, said motor means mounted to said slide means such that said wafer periphery is rotatable and movable in a movement plane parallel a plane of cut to be made through the tube and into and out of cutting engagement with the tube as said slide means is moved towards and away from the circumferential segment of the tube when said frame is clamped thereto whereby to cut the tube into two in said movement plane with said cutting periphery without relative rotation between said frame and the tube and without grippingly engaging a generally nonaccessible portion of the tube opposite the circumferential portion to which said frame is clamped.

5. The tube cutter apparatus of claim 4, said clamp means being adjustably mounted on said frame, the tube cutter apparatus further comprising adjustment means for selectively adjustably positioning said frame relative said clamp means when said frame is clamped to the tube whereby to adjust said movement plane towards and away from said plane of cut.

6. The tube cutter apparatus of claim 4, said clamp means including selectively electromagnetizable means for electromagnetically clamping said frame to a metal tube.

7. A tube cutter apparatus for cutting a tube into two, wherein the tube is constrained against rotation and only a circumferential segment thereof is generally accessible prior to cutting the tube, said tube cutter apparatus comprising:

a frame;

clamp means adjustably mounted on said frame for clamping said frame to only a portion of an accessible circumferential segment of a tube to be cut such that said frame and the tube are constrained from rotational movement relative one another;

slide means movably mounted on said frame for free-sliding movement along said frame in a straight line path towards and away from the circumferential segment of the tube when said frame is clamped thereto;

motor means mounted for movement with said slide means for providing rotation;

a grinding wafer having a circular outer cutting periphery, said wafer coupled to said motor means for rotation thereby and movement therewith, said motor means mounted to said slide means such that said wafer periphery is rotatable and movable in a movement plane parallel a plane of cut to be made through the tube and into and out of cutting engagement with the tube as said slide means is moved towards and away from the circumferential portion when said frame is clamped thereto, whereby to cut the tube into two in said movement plane with said cutting periphery without relative rotation between said frame and the tube and without grippingly engaging a generally nonaccessible portion of the tube opposite the circumferential portion to which said frame is clamped; and adjustment means for selectively adjustably positioning said frame relative to said clamp means when said frame is clamped to the tube whereby to adjust said movement plane towards and away from said plane of cut.

8. The tube cutter apparatus of claim 7, said clamp means including selectively electromagnetizable means for electromagnetically clamping said frame to a metal tube.

9. A method of cutting a tube into two, wherein said tube is constrained against rotation and only a circumferential segment thereof is generally accessible prior to cutting said tube, said method comprising:

clamping a frame to only a portion of said circumferential segment such that said frame and said tube are constrained from rotational movement relative one another;

movably mounting a slide means on said frame for free-sliding movement along said frame in a straight line path towards and away from said circumferential segment of said tube;

coupling a grinding wafer having a circular outer cutting periphery to a selectively energizable motor means for rotation thereby and movement therewith, mounting said motor means for movement with said slide means such that said wafer periphery is rotatable and movable in a movement plane parallel a plane of cut to be made through said tube and into and out of cutting engagement with said tube as said slide means is moved towards and away from said circumferential segment when said frame is clamped to said tube and said motor is energized;

mounting combination slide control/switch means to said slide means, said motor means being energized by application of pressure to said combination means, such that when pressure is applied to said combination means to energize said motor means said slide means will be caused to be moved toward said circumferential segment; and applying pressure to energize said motor means and causing movement of said slide means towards said circumferential segment to cut said tube into two in said movement plane with said cutting periphery without relative rotation between said frame and said tube and without grippingly engaging a generally nonaccessible portion of said tube opposite said circumferential portion to which said frame is clamped.

10. The method of claim 9 further comprising:

providing means for selectively adjustably positioning said frame relative said tube without unclamping said frame from said tube; and adjusting said movement plane towards or away from said plane of cut.

11. The method of claim 9, wherein said tube is metal, further comprising electromagnetically clamping said frame to said circumferential segment of said metal tube.

12. A method of cutting a tube into two, wherein said tube is constrained against rotation and only a circumferential segment thereof is generally accessible prior to cutting said tube, said method comprising:

clamping a frame to only a portion of said circumferential segment such that said frame and said tube are constrained from rotational movement relative one another;

movably mounting a slide means on said frame for free-sliding movement along said frame in a straight line path towards and away from said circumferential segment of said tube;

coupling a grinding wafer having a circular outer cutting periphery to a motor means for rotation thereby and movement therewith, mounting said motor means for movement with said slide means such that said wafer periphery is rotatable and movable in a movement plane parallel a plane of cut to be made through said tube and into and out of cutting engagement with said tube as said slide means is moved towards and away from said circumferential segment when said frame is clamped thereto;

providing adjustment means for selectively adjustably positioning said frame relative said tube without unclamping said frame from said tube;

adjusting said movement plane towards and away from said plane of cut; and moving said slide means towards said circumferential segment whereby to cut said tube into two in said movement plane with said cutting periphery without relative rotation between said frame and said tube and without grippingly engaging a generally nonaccessible portion of said tube opposite said circumferential segment to which said frame is clamped.

13. The method of claim 12, wherein said tube is metal, further comprising electromagnetically clamping said frame to said circumferential segment of said metal tube.

* * * * *

UNITED STATES PATENT AND TRADEMARK OFFICE
CERTIFICATE OF CORRECTION

PATENT NO. : 4,718,201

DATED : January 12, 1988

INVENTOR(S) : Gerald A. Legge

It is certified that error appears in the above-identified patent and that said Letters Patent is hereby corrected as shown below:

Column 11, line 52, "way" should be -- away -- .

Column 13, line 33, "relative to said" should be

-- relative said -- .

Signed and Sealed this

Twenty-sixth Day of July, 1988

Attest:

DONALD J. QUIGG

Attesting Officer    Commissioner of Patents and Trademarks